(12) United States Patent
Akae et al.

(10) Patent No.: US 10,817,148 B2
(45) Date of Patent: Oct. 27, 2020

(54) DISPLAY CONTROL METHOD OF COMMUNICATION DEVICE, CONTROL METHOD OF SERVER, AND RECORDING MEDIUM

(71) Applicant: CASIO COMPUTER CO., LTD., Tokyo (JP)

(72) Inventors: Naoki Akae, Fussa (JP); Hiroyuki Shibusawa, Musashino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/141,235

(22) Filed: Sep. 25, 2018

(65) Prior Publication Data

US 2019/0095065 A1  Mar. 28, 2019

(30) Foreign Application Priority Data

Sep. 27, 2017  (JP) ................. 2017-185684

(51) Int. Cl.
*G06F 3/0484* (2013.01)
*G06F 3/0488* (2013.01)
*G06T 11/20* (2006.01)

(52) U.S. Cl.
CPC ........ *G06F 3/0484* (2013.01); *G06F 3/04886* (2013.01); *G06T 11/206* (2013.01)

(58) Field of Classification Search
CPC .................................................. G06F 3/0484
See application file for complete search history.

(56) References Cited

U.S. PATENT DOCUMENTS

| 5,535,317 A | * | 7/1996 | Tanaka et al. .......... G06T 11/00 |
| 5,557,718 A | | 9/1996 | Tsuneyoshi et al. |

(Continued)

FOREIGN PATENT DOCUMENTS

| EP | 2 503 468 A2 | 9/2012 |
| JP | H06-083974 A | 3/1994 |

(Continued)

OTHER PUBLICATIONS

"Desmos, Desmos User Guide, translated by Yoshito Horikawa", published on the internet (https://desmos.s3.amazonaws.com/Desmos_User_Guide_JA.pdf) (searched on Sep. 27, 2017).

(Continued)

*Primary Examiner* — James J Debrow
(74) *Attorney, Agent, or Firm* — Scully Scott Murphy & Presser

(57) ABSTRACT

A display control method executed by a client terminal, includes: accepting a first and second formulas; displaying a first coordinate system having a first coordinate range corresponding to the first formula, in a first area, and a second coordinate system having a second coordinate range corresponding to the second formula, in a second area, on a display screen of a display; accepting a user operation of moving one area of first and second areas to overlap at least a part of the one area onto the other area of the first and second areas; and in response to the user operation, displaying, on the display screen, an integrated coordinate system having a coordinate range for integration determined based on the first and second coordinate ranges, and drawing first and second graphs representing the first and second formulas, at the integrated coordinate system.

7 Claims, 14 Drawing Sheets

(56) References Cited

U.S. PATENT DOCUMENTS

| | | | |
|---|---|---|---|
| 8,269,773 B2 | 9/2012 | Gregg, III | |
| 2007/0046674 A1* | 3/2007 | Sudoh | G06T 11/20 |
| 2009/0307587 A1 | 12/2009 | Kaneko | |
| 2010/0225649 A1* | 9/2010 | Okano | G06T 11/20 |
| 2014/0285528 A1* | 9/2014 | Yoshizawa | G09G 5/37 |
| 2015/0015504 A1* | 1/2015 | Lee et al. | G06F 3/04845 |
| 2015/0178963 A1 | 6/2015 | Lu | |
| 2015/0310646 A1* | 10/2015 | Karoji et al. | G06T 11/20 |

FOREIGN PATENT DOCUMENTS

| | | |
|---|---|---|
| JP | H10-161980 A | 6/1998 |
| JP | 2007-304656 A | 11/2007 |

OTHER PUBLICATIONS

Examination report No. 1 for standard patent application dated Sep. 13, 2019 received in Australian Patent Application No. AU 2018226489.

\* cited by examiner

DISPLAY CONTROL METHOD OF COMMUNICATION DEVICE, CONTROL METHOD OF SERVER, AND RECORDING MEDIUM

CROSS-REFERENCE TO RELATED APPLICATIONS

The present application claims priority of Japanese Patent Application No. 2017-185684 filed on Sep. 27, 2017, and all contents of the basic application are incorporated into the present application.

BACKGROUND

1. Technical Field

The invention relates to a display control method of a communication device, a control method of a server, and a recording medium.

2. Description of Related Art

There has been known a graph drawing application which is applicable on a web browser. For example, "Desmos, Desmos User Guide, translated by Yoshito HORIKAWA", published on the internet (https://desmos.s3.amazonaws.com/Desmos_User_Guide_JA.pdf) (searched on Sep. 27, 2017) is a document relating to an application running on a web browser, and describes that performing calculation based on a formula input into a formula list by a user, and drawing a graph based on the result of calculation.

Such web application is required to have improved operability of graph drawing.

Such web application is also used on site of school education where ICT (Information and Communication Technology) is popularized. However, for example, in the case where a plurality of people such as students and teachers wish to share the result of calculation, a server cannot reuse the result of calculation once executed.

The present invention aims to provide a display control method of a communication device, a control method of a server, and a recording medium, that have high operability relating to graph drawing.

BRIEF SUMMARY

A display control method executed by a client terminal, includes: accepting input of a first formula and a second formula; displaying a first coordinate system having a first coordinate range corresponding to the input first formula and a second coordinate system having a second coordinate range corresponding to the input second formula, on a display screen of a display; accepting a user operation of moving one area of a first area and a second area on the display screen of the display so as to overlap at least a part of the one area onto the other area of the first and second areas, the first coordinate system being displayed in the first area and the second coordinate system being displayed in the second area, on the display screen of the display; and in response to acceptance of the user operation, displaying, on the display screen of the display, an integrated coordinate system having a coordinate range for integration determined based on the first coordinate range and the second coordinate range, and drawing a first graph representing the first formula and a second graph representing the second formula, at the integrated coordinate system displayed on the display screen of the display.

A display control method executed by a client terminal, includes: accepting input of a first formula and a second formula; displaying a first coordinate system having a first coordinate range corresponding to the input first formula and a second coordinate system having a second coordinate range corresponding to the input second formula, on a display screen of a display; accepting indication for synthesizing a first area and a second area, the first coordinate system being displayed in the first area and the second coordinate system being displayed in the second area, on the display screen of the display; and when the first coordinate range and the second coordinate range are different, on the display screen of the display, drawing, in the first area, a graph representing the second formula based on plot points calculated by using both of a coordinate range for integration and the second formula, together with a graph representing the first formula based on plot points calculated by using both of the coordinate range for integration and the first formula, the coordinate range for integration being a coordinate range determined based on the first coordinate range and the second coordinate range.

A non-transitory recording medium has a program recorded thereon that is executable to control a computer: accepting input of a first formula and a second formula; displaying a first coordinate system having a first coordinate range corresponding to the input first formula and a second coordinate system having a second coordinate range corresponding to the input second formula, on a display screen of a display; accepting a user operation of moving one area of a first area and a second area on the display screen of the display so as to overlap at least a part of the one area onto the other area of the first and second areas, the first coordinate system being displayed in the first area and the second coordinate system being displayed in the second area, on the display screen of the display; and in response to acceptance of the user operation, displaying, on the display screen of the display, an integrated coordinate system having a coordinate range for integration determined based on the first coordinate range and the second coordinate range, and drawing a first graph representing the first formula and a second graph representing the second formula, at the integrated coordinate system displayed on the display screen of the display.

A non-transitory recording medium has a program recorded thereon that is executable to control a computer: accepting input of a first formula and a second formula; displaying a first coordinate system having a first coordinate range corresponding to the input first formula and a second coordinate system having a second coordinate range corresponding to the input second formula, on a display screen of a display; accepting indication for synthesizing a first area and a second area, the first coordinate system being displayed in the first area and the second coordinate system being displayed in the second area, on the display screen of the display; and when the first coordinate range and the second coordinate range are different, on the display screen of the display, drawing, in the first area, a graph representing the second formula based on plot points calculated by using both of a coordinate range for integration and the second formula, together with a graph representing the first formula based on plot points calculated by using both of the coordinate range for integration and the first formula, the coordinate range for integration being a coordinate range determined based on the first coordinate range and the second coordinate range.

BRIEF DESCRIPTION OF THE DRAWINGS

The components in the drawings are not necessarily to scale relative to each other.

DETAILED DESCRIPTION

Embodiments of the present invention will be described with reference to the drawings.

Figure 1:
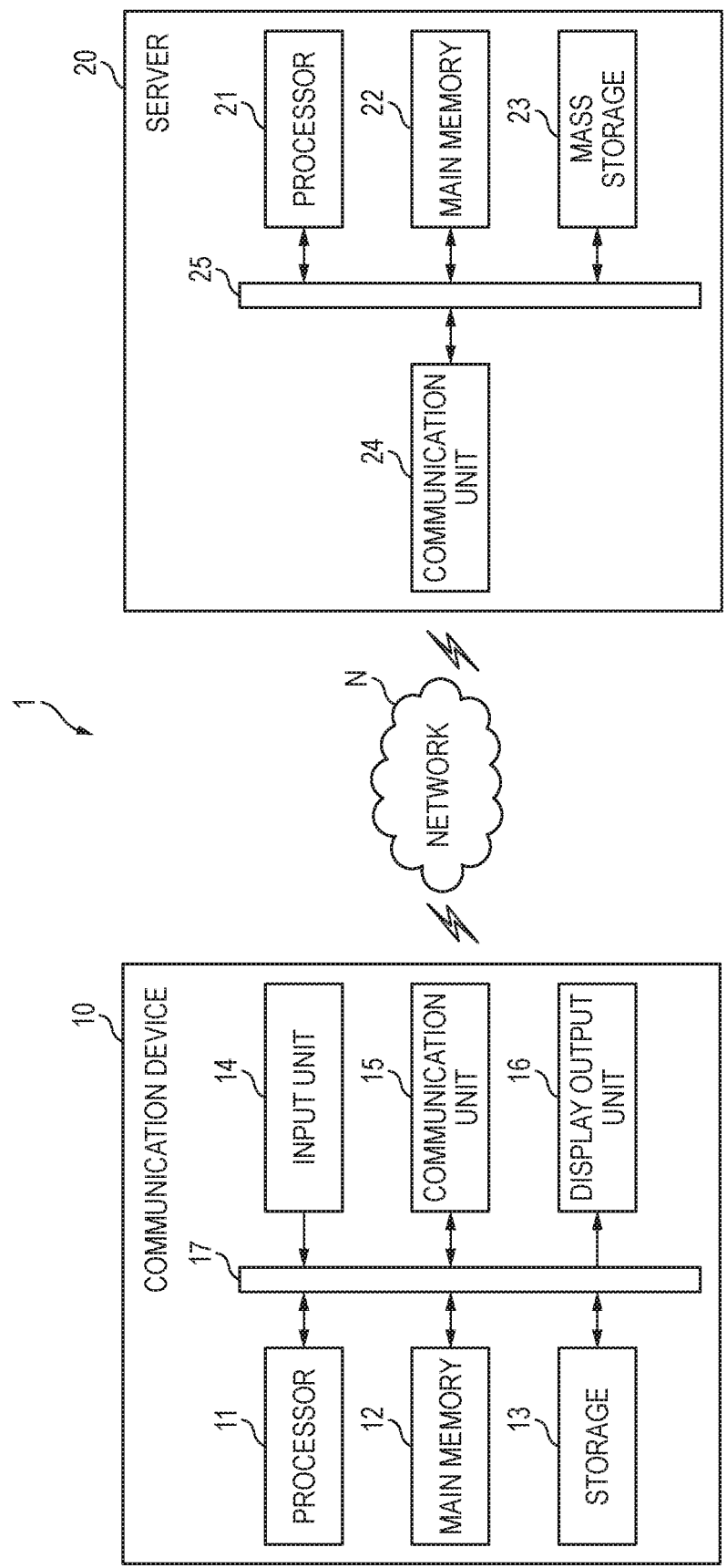
FIG. 1 is a diagram illustrating an example of a configuration of an entire system.

FIG. 1 is a diagram illustrating an example of a configuration of an entire system inclusive of a client terminal and a server according to an embodiment of the present invention. The system 1 includes a communication device 10 and a server 20. The communication device 10 is communicably connected to the server 20 via a communication network N such as the internet. The communication device 10 may be a tablet terminal, a smartphone, a personal computer (PC), and the like.

In the system 1, data for graph drawing/table creation which are input into the communication device 10, is sent from the communication device 10 to the server 20. The server 20 executes calculation for graph drawing/table creation based on the data and sends the result of calculation to the communication device 10. The communication device 10 executes graph drawing/table creation based on the result of calculation.

The communication device 10 has a processor 11, a main memory 12, a storage 13, an input unit 14, a communication unit 15, and a display output unit 16. Each of the above is connected to one another via a system bus 17.

The processor 11 may be an integrated circuit such as CPU (Central Processing Unit). The processor 11 reads various programs such as a communication device control program previously stored on the storage 13 and a program running on a web browser, expands and holds the programs on the main memory 12, and executes the various programs in response to signal input from the input unit 14 and/or signal received by the communication unit 15, so as to control operation of each unit. The various programs may be downloaded to the storage 13 via the communication unit 15 from a non-illustrated web server on the communication network N.

The input portion 14 includes an external input device such as keyboard and mouse or a key input unit displayed on the display output portion 16 of the communication device 10. Due to operation of the input unit 14, input signal is input into the processor 11 from an input interface (I/F) via the system bus 17.

The display output unit 16 includes an external display device such as liquid crystal display or a display such as a liquid crystal display of the communication device 10. Output signal is transferred from the processor 11 to the display output unit 16 via the system bus 17 and an output interface (I/F).

The server 20 has a processor 21, a main memory 22, a mass storage 23, and a communication unit 24. Each of the above is connected to one another via a system bus 25. The server 20 may also be connected to a non-illustrated input device and/or output device via its input I/F and/or output I/F.

The processor 21 may be an integrated circuit such as CPU. The processor 21 reads various programs such as a server control program that is recorded previously or downloaded on the mass storage 23, expands and holds the programs on the main memory 22, and fetches and decodes commands of the programs, so as to control operation of each unit according to the content of the commands. Then, the processor 21 executes calculation based on data input from the communication device 10 according to a calculation processing program for graph drawing/table creation.

In the present embodiment, a user designates the address of the server 20 on a web browser running on the communication device 10, thereby sending a request to the server 20. The web browser of the communication device 10 constructs a screen of a web application for graph drawing/formula creation based on a response received from the server 20. Further, the web browser of the communication device 10 issues a request to the server 20 in response to input acceptance of data such as a formula and receives the result of calculation executed by the server 20 according to the calculation processing program as a response from the server 20. Namely, in response to the request of calculation from the communication device 10, the server 20 sends the result of calculation executed on the processor 21 according to the calculation program to the communication device 10 as a response. Further, the communication device 10 uses the received result of calculation to perform graph drawing/table creation via the processor 11 according to the program running on the web browser. In this way, the program running on the web browser of the communication device 10 and the calculation processing program of the server 20 achieve a function as a web application for graph drawing/formula creation.

Figure 2:
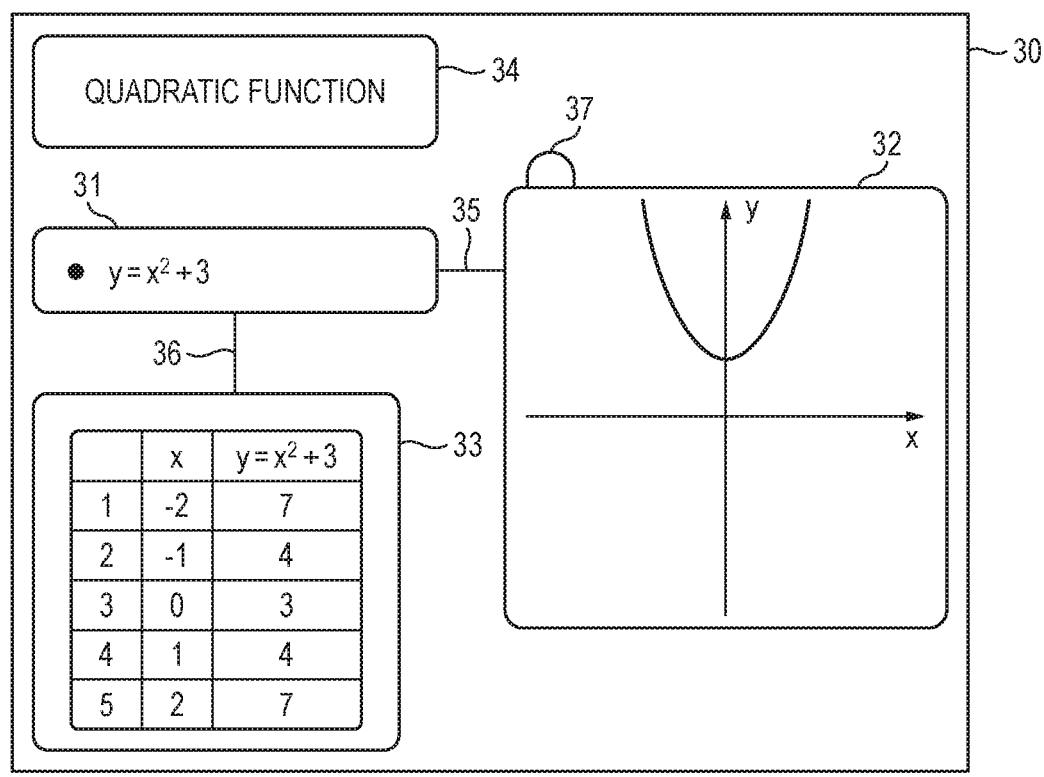
FIG. 2 is a diagram illustrating an example of a display screen.

In the present embodiment, the client terminal, i.e. the communication device 10 executes only input acceptance of data such as a formula and only graph drawing/table creation, but the communication device 10 does not execute calculation processing for graph drawing/table creation. The calculation processing is executed by the server, i.e. the server 20, which is connected to the client terminal via the communication network N. Thereby, it is possible to provide the calculation result from the server to the client terminal and to perform graph drawing/table creation with the client terminal without disclosing a calculation algorithm having excellent accuracy. FIG. 2 is a diagram illustrating an example of a display screen 30 of the graph drawing application running on the web browser. As described above, the graph drawing application is a function calculator web application, provided by the program running on the web browser of the client terminal and the calculation processing program of the server.

The display screen 30 as illustrated in FIG. 2 is, for example, a screen display of the display output unit 16 of the communication device 10. Various floating objects are displayed on the display screen 30. Hereinafter, each object is referred to as a label. FIG. 2 includes four types of labels, including a formula label 31, a graph label 32, a table label 33, and a memo label 34.

Figure 4:
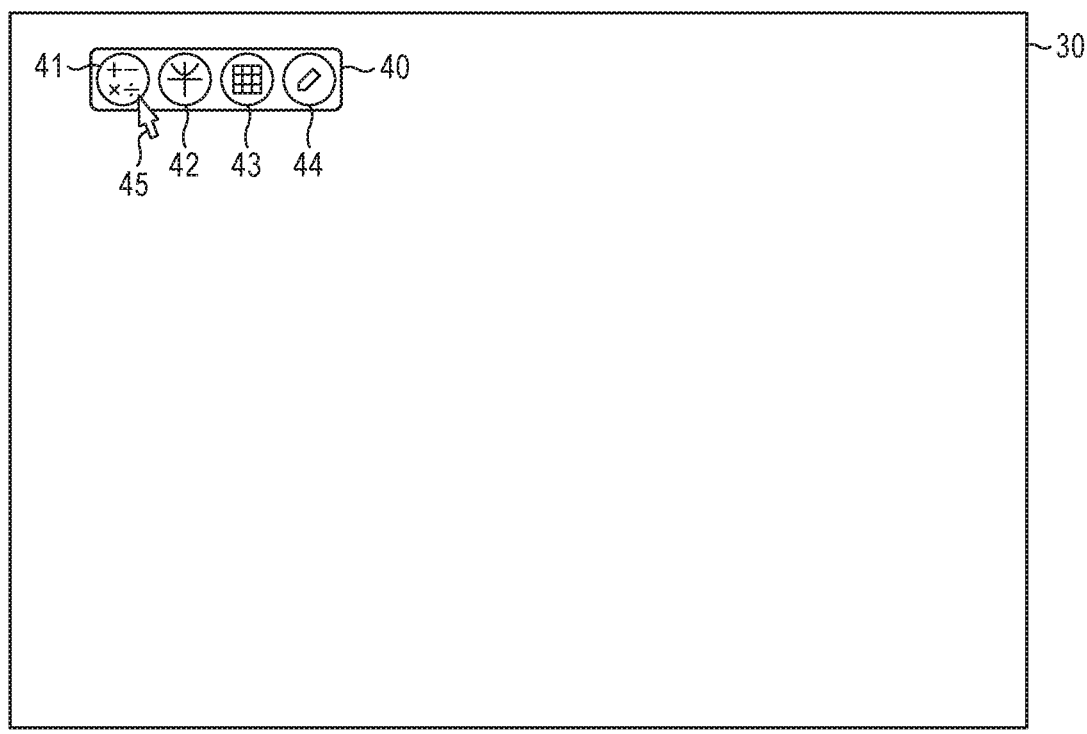
FIG. 4 is a diagram illustrating an example of the display screen of the communication device.

The formula label 31 is a label for inputting a formula (formula specifying unit), which is a formula input by the user is displayed. The formula label 31 is displayed, for example, in the initial display screen 30 as illustrated in FIG. 4, by selecting (e.g. clicking or tapping; the same goes with the term "select" hereinafter) a formula input button 41 of a tool bar 40. The tool bar 40 may be displayed, for example, by selecting "show/hide the tool bar" from a menu displayed when any position on the screen is selected by the user.

The graph label 32 is a label for displaying a graph (graph specifying unit), which is based on confirmation of the above formula input, a graph is drawn based on a calculation result (coordinates of plot points) calculated on the server 20. After input confirmation of the formula label 31, creation of the graph label 32 is executed, for example, by selecting a graph display button 42 of the tool bar 40 as illustrated in FIG. 4. A tab 37 is displayed accompanying the graph label 32.

The table label 33 is a label for displaying a table, which is based on confirmation of the above formula input, a table is created based on a calculation result (table values) calculated on the server 20. After input confirmation of the formula label 31, creation of the table label 33 is executed, for example, by selecting a table display button 43 of the tool bar 40 as illustrated in FIG. 4.

On the graph label 32 or the table label 33, the user may set any prescribed graph area or table area, i.e. a coordinate range for drawing or a range of values to be created. Such settings may be performed, for example, by selecting "graph range" or "table range" from a menu displayed when any position on the screen is selected by the user, and inputting a desired range. The graph area, as described below, is changeable via moving operation input by the user after creation of the graph label 32.

The memo label 34 is a label for text input, which displays various information input arbitrarily by the user. The memo label 34 is displayed, for example, by selecting a memo input button 44 of the tool bar 40 as illustrated in FIG. 4.

In the display screen 30 as illustrated in FIG. 2, the formula label 31 and the graph label 32 are combined with each other by a line 35. This line 35 indicates that the formula label 31 and the graph label 32 are linked up, i.e. a graph is drawn on the graph label 32 based on data of the formula input on the formula label 31. Similarly, the formula label 31 and the table label 33 are combined with each other by a line 36. This line 36 also indicates that the formula label 31 and the table label 33 are linked up.

In the present embodiment, two or more formula labels 31 may be created, and two or more graph labels 32 respectively linked up with the two or more formula labels 31 may be created. Namely, a plurality of formula labels 31 and a plurality of graph labels 32 may be displayed in the identical display screen 30. While one formula label and a graph label linked up therewith, and the other formula label and a graph label linked up therewith, are independent to each other, in the present embodiment, the two graph labels independent to each other may be integrated into a single graph label, and the two graphs respectively drawn on the two graph labels before integration may be drawn and displayed on the single graph label. Namely, two graphs, which are respectively drawn on physically different graph labels, may overlap each other.

Figure 3A:
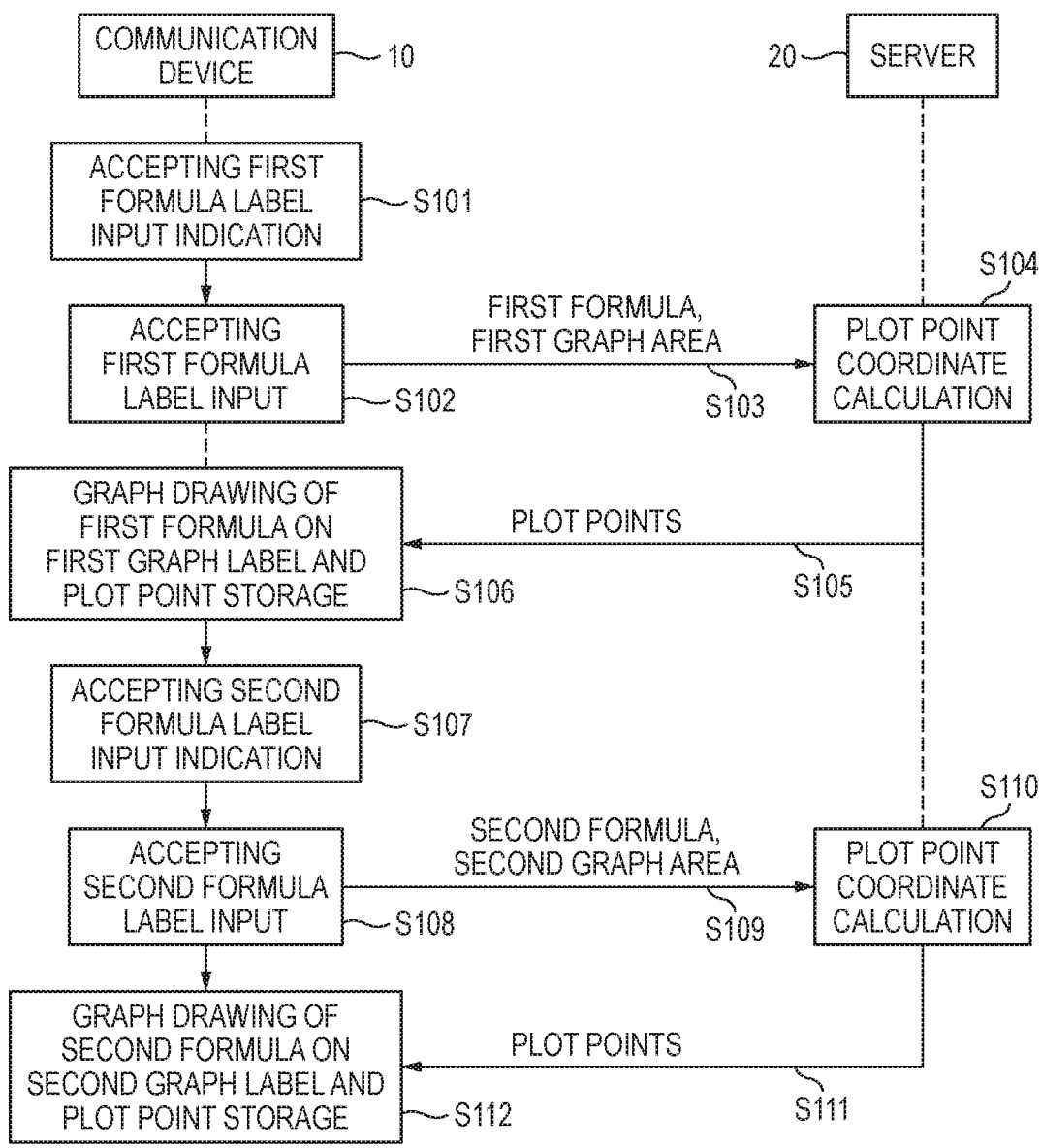
FIG. 3A is a diagram illustrating an example of a drawing process of two graph labels.
Figure 3B:
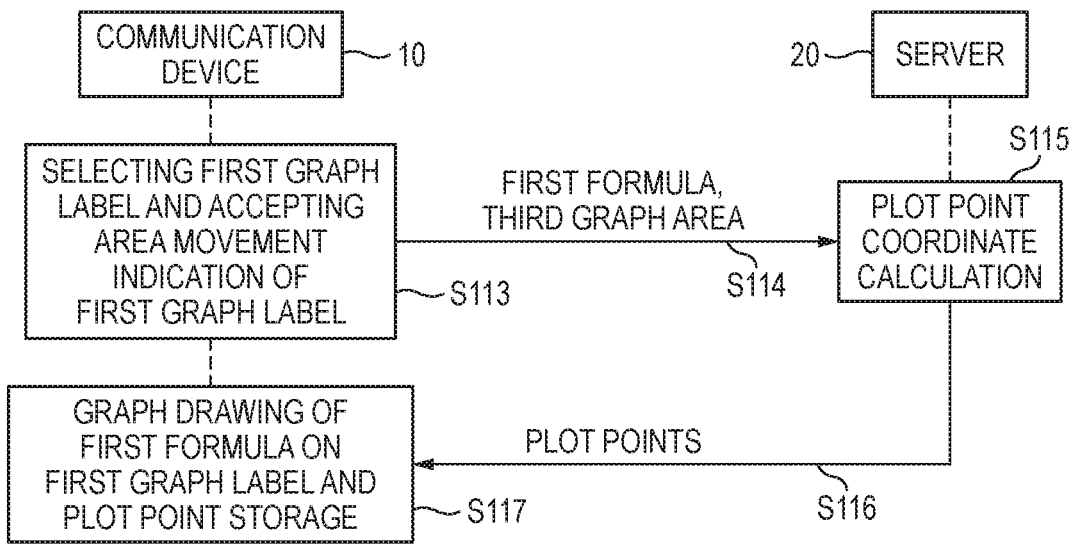
FIG. 3B is a diagram illustrating an example of a drawing process when graph areas of the graph labels are changed.
Figure 3C:
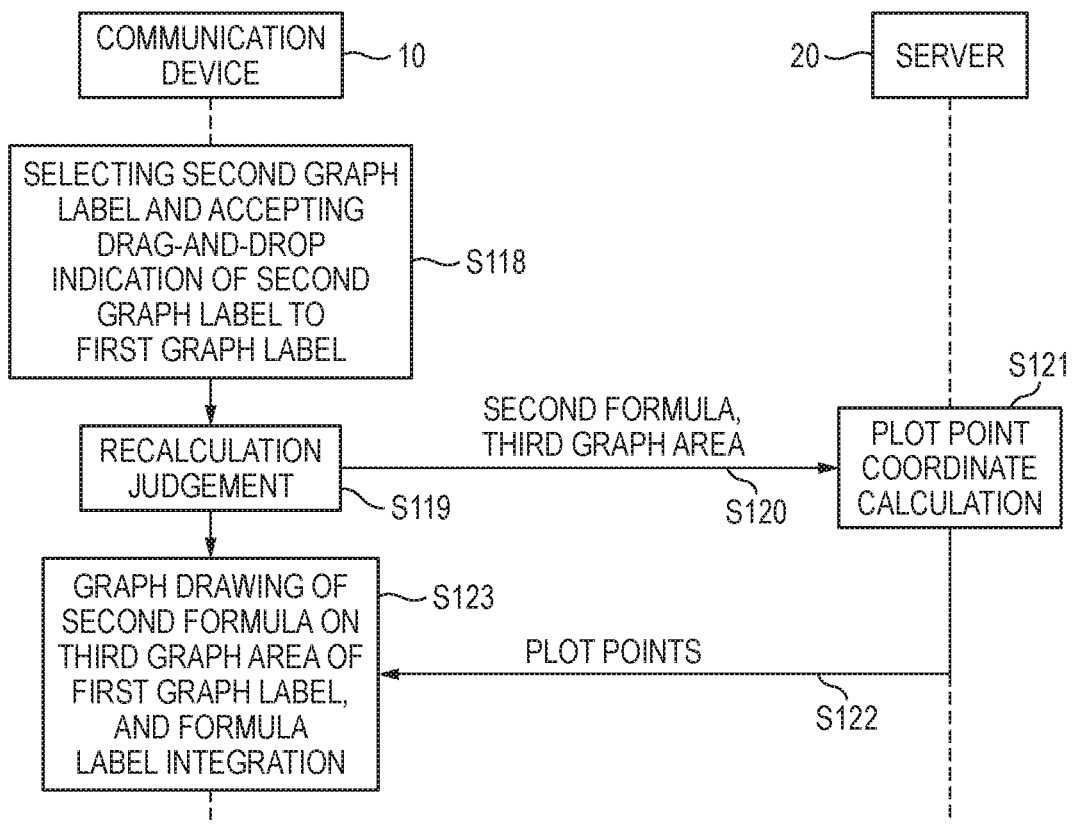
FIG. 3C is a diagram illustrating an example of an integrating process of the two graph labels.

FIGS. 3A to 3C are diagrams illustrating an example of a process from drawing until integration of two graph labels via the communication device 10 and the server 20. Hereinafter, a series of flows integrating and displaying the two graph labels is specifically described by referring to FIGS. 3A to 3C together with FIGS. 4 to 13.

FIG. 3A illustrates an example of a process drawing a first graph on a first graph label (first area) 32a and drawing a second graph on a second graph label (second area) 32b.

For example, as illustrated in FIG. 4, a user moves a cursor 45 to the formula input button 41 of the tool bar 40 on the display screen 30 and selects it. Thereby, the communication device 10 accepts a first formula label input indication (Step S101).

Figure 5:
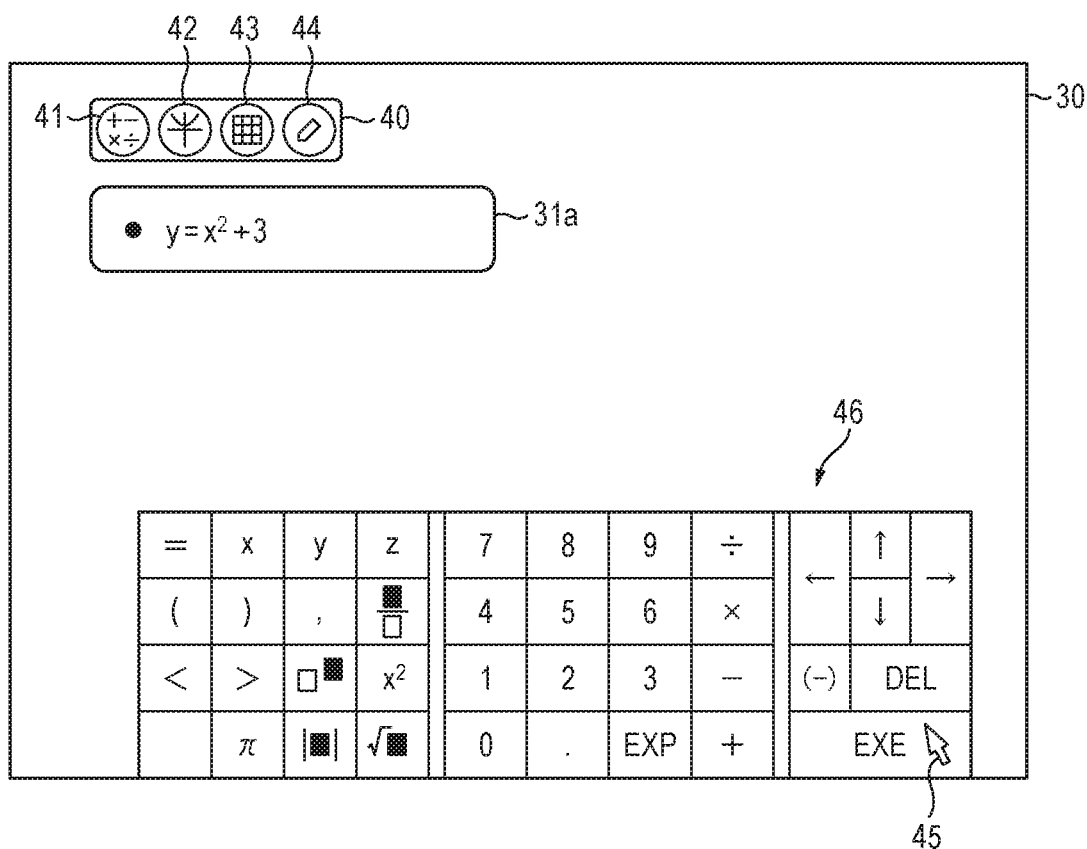
FIG. 5 is a diagram illustrating an example of the display screen of the communication device.

After Step S101, as illustrated in FIG. 5, the first formula label 31a together with a key input unit 46 are displayed on the display screen 30 of the communication device 10. The key input unit 46 includes various keys, such as number keys [0] to [9], arithmetic symbol keys [+][−][×][÷], an execute key [EXE], and arrow cursor keys. The user inputs, for examples, a first formula $y=x^2+3$ on the first formula label 31a by using the key input unit 46 and confirms it by selecting the execute key. The communication device 10 accepts formula input of the first formula label 31a and executes processing so as to confirm the formula input on the first formula label 31a as the first formula (Step S102). After this confirmation processing, for example, by selecting the graph display button 42 of the tool bar 40, or via the confirmation processing itself, the communication device 10 accepts a graph drawing request.

The communication device 10 sends, to the server 20 input data, i.e., data of the input first formula and data of a first graph area (a first coordinate range; e.g. $-5 \leq x \leq 5$, $-5 \leq y \leq 5$ as default setting) set on the first graph label 32a, together with the graph drawing request (Step S103).

The server 20, in response to the graph drawing request, calculates coordinates of plot points to be plotted on the first graph label 32a based on the input data received from the communication device 10 (Step S104).

The server 20 sends, to the communication device 10, data of the coordinates of the plot points calculated in Step S104 (Step S105).

Figure 6:
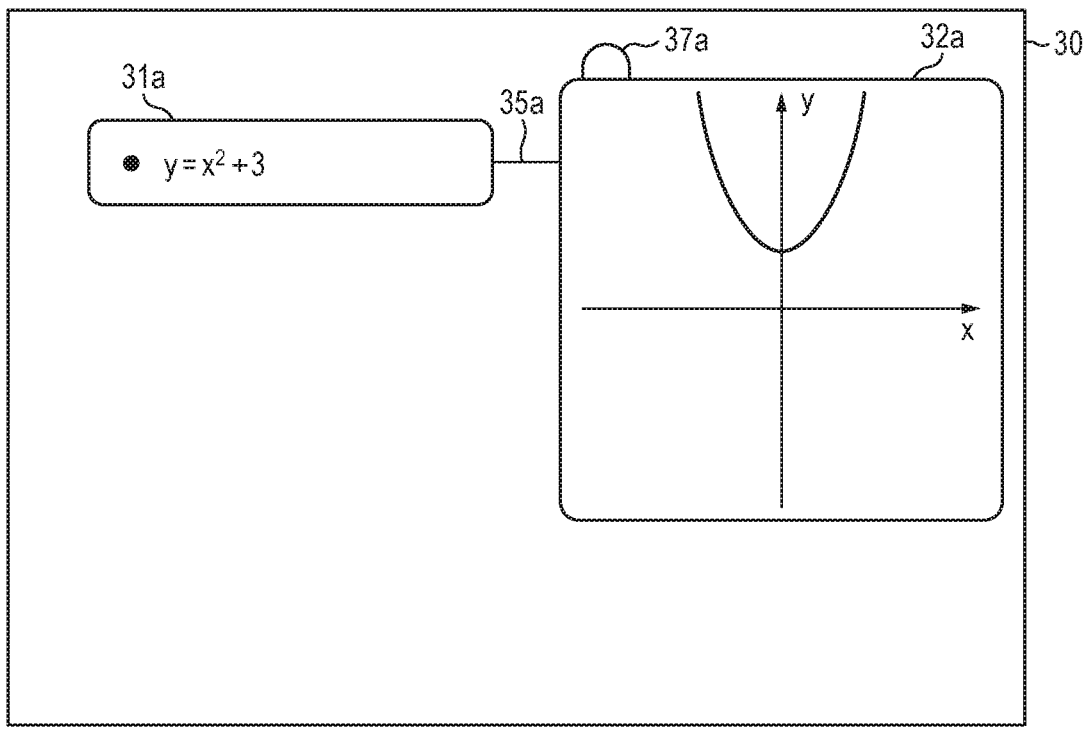
FIG. 6 is a diagram illustrating an example of the display screen of the communication device.

The communication device 10 creates and displays the first graph label 32a by using the data of the coordinates of the plot points received from the server 20 (Step S106). The communication device 10 draws a graph of the first formula on the first graph area of the first graph label 32a by using the coordinates of the plot points calculated on the server 20. As illustrated in FIG. 6, the first formula label 31a and the first graph label 32a linked up therewith are displayed on the display screen 30 of the communication device 10 in a manner that the first formula label 31a and the first graph label 32 are combined with each other via the line 35a. Further, a tab 37a is displayed accompanying the first graph label 32a.

In Step S106, simultaneously with graph drawing, the data of the coordinates of the plot points received from the server 20 is stored in the storage 13. The communication device 10 relates the coordinate data of the plot points of the first formula in the first graph area of the first graph label 32a with the first formula and the first graph area, and stores the same in the storage 13.

Figure 7:
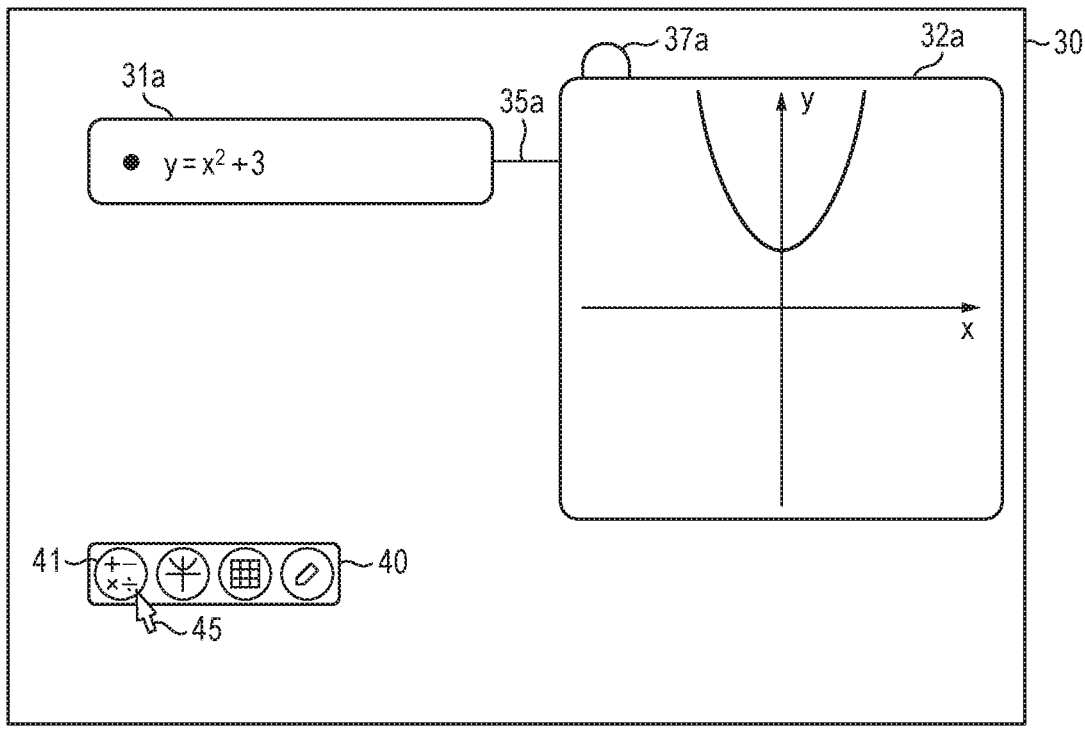
FIG. 7 is a diagram illustrating an example of the display screen of the communication device.

Next, as the display screen 30 illustrated in FIG. 7, the user selects the formula input button 41 again. Since the tool bar 40 is hided simultaneously with display of the first graph label 32a on the display screen 30 as illustrated in FIG. 6, the formula input button 41 is selected after the tool bar 40 is displayed again on the display screen 30 as illustrated in FIG. 7. But the tool bar 40 may be displayed constantly as well. The communication device 10 accepts a second formula label input indication (Step S107).

Figure 8:
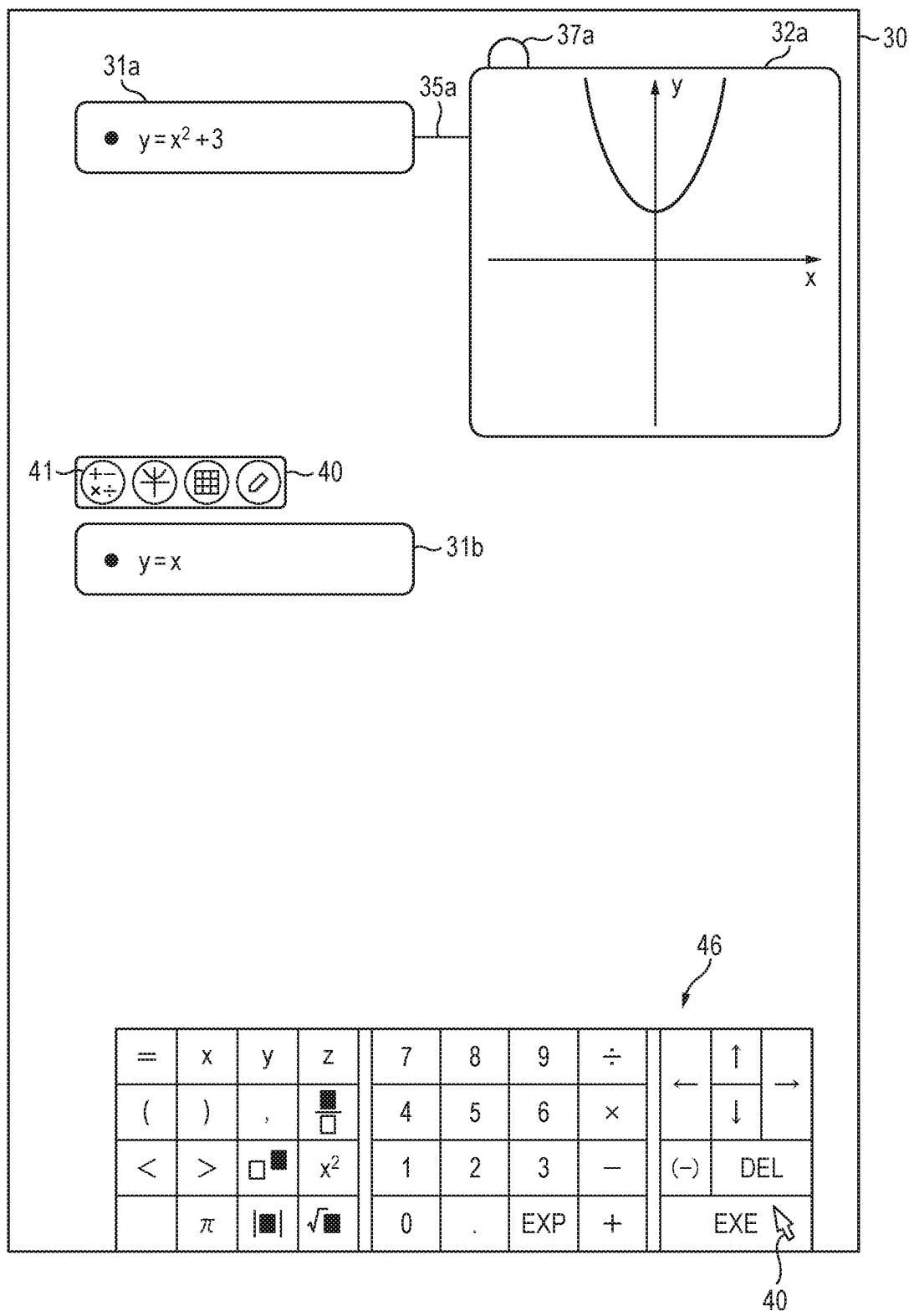
FIG. 8 is a diagram illustrating an example of the display screen of the communication device.

After Step S107, as illustrated in FIG. 8, the second formula label 31b together with the key input unit 46 are displayed again on the display screen 30 of the communication device 10. The user inputs, for examples, a second formula y=x on the second formula label 31b by using the key input unit 46 and confirms it by selecting the execute key. The communication device 10 accepts formula input of the second formula label 31b and executes processing so as to confirm the formula input on the second formula label 31b as the second formula (Step S108). After this confirmation processing, for example, by selecting the graph display button 42 of the tool bar 40, or via the confirmation processing itself, the communication device 10 accepts a graph drawing request.

Although the display screen 30 as illustrated in FIGS. 4 to 7 and the display screen 30 as illustrated from FIG. 8 have different sizes, each display screen is displayed in a single screen. Such single-screen display is performed not only in the case where the entire screen is displayed in a window on the display output unit 16 of the communication device 10, but also in the case where the entire screen does not fall within the window and has to be viewed via a scroll, etc.

The communication device 10 sends, to the server 20 input data, i.e., data of the input second formula and data of a second graph area (a second coordinate range; e.g. $-5 \le x \le 5$, $-5 \le y \le 5$ as default setting) set on the second graph label 32b, together with the graph drawing request (Step S109).

The server 20, in response to the graph drawing request, calculates coordinates of plot points to be plotted on the second graph label 32b based on the input data received from the communication device 10 (Step S110).

The server 20 sends, to the communication device 10, data of the coordinates of the plot points calculated in Step S110 (Step S111).

Figure 9:
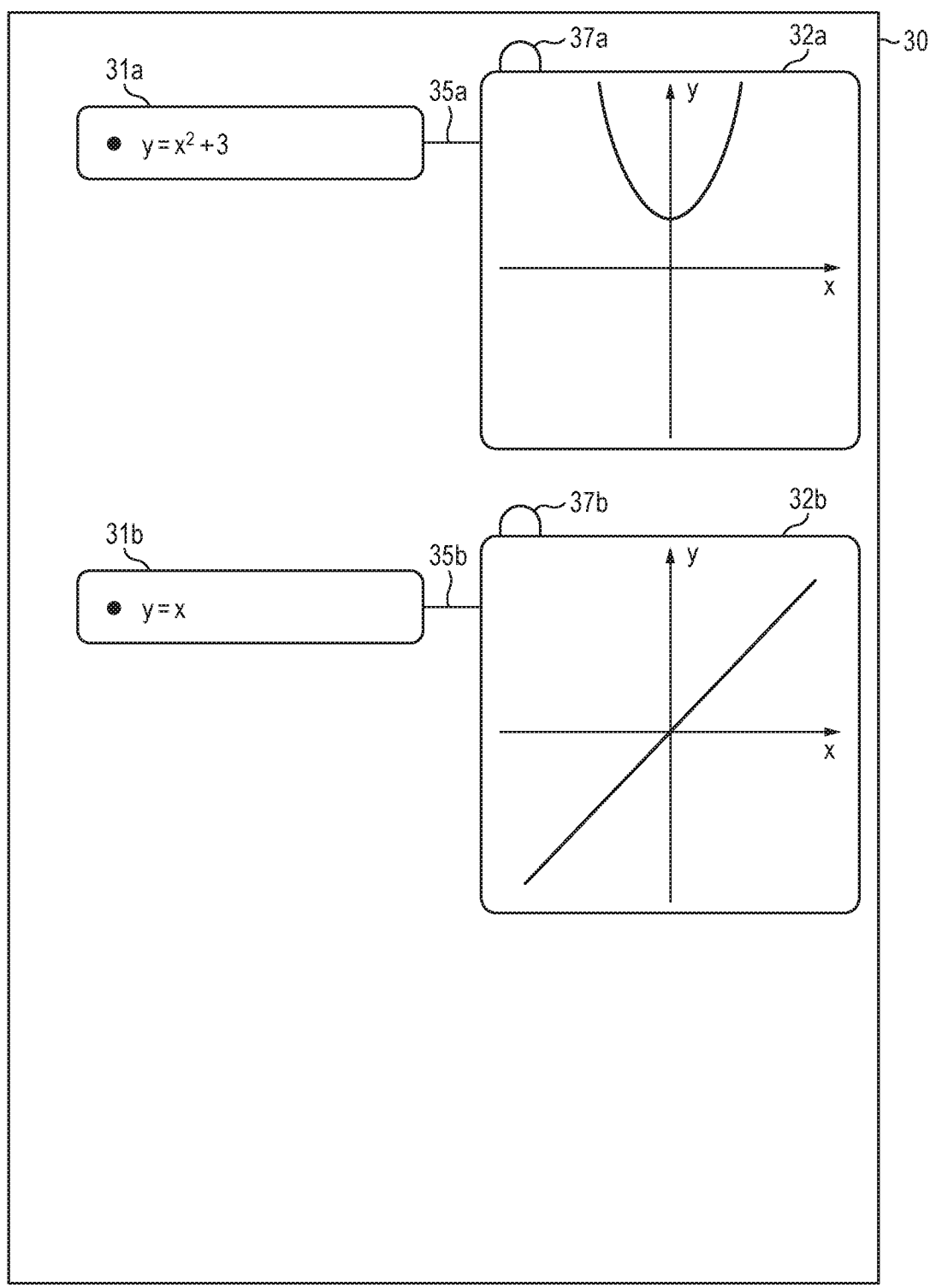
FIG. 9 is a diagram illustrating an example of the display screen of the communication device.

The communication device 10 creates and displays the second graph label 32b by using the date of the coordinates of the plot points received from the server 20 (Step S112). The communication device 10 draws a graph of the second formula on the second graph area of the second graph label 32b by using the coordinates of the plot points calculated on the server 20. As illustrated in FIG. 9, in addition to the first formula label 31a and the first graph label 32a, the second formula label 31b and the second graph label 32b linked up therewith are displayed on the display screen 30 of the communication device 10 in a manner that the second formula label 31b and the second graph label 32b are combined with each other via the line 35b. Further, a tab 37b is displayed accompanying the second graph label 32b.

In Step S112, simultaneously with graph drawing, the data of the coordinates of the plot points received from the server 20 is stored in the storage 13. The communication device 10 relates the coordinate data of the plot points of the second formula in the second graph area of the second graph label 32b with the second formula and the second graph area, and stores the same in the storage 13.

Due to the above Steps S101 to S112, the two graph labels 32a, 32b are displayed on the display screen 30 as illustrated in FIG. 9.

In Step S109, before starting communication processing with the server 20, the data of the second formula may be compared with the data of the above first formula, and the second graph area may be compared with the first graph area. If they are respectively the same as each other, the coordinate data of the plot points of the second formula in the second graph area of the second graph label 32b is the same as the coordinate data of the plot points of the above first formula, and thus the server 20 does not need to recalculate. Therefore, if the data of the second formula is determined as identical to the data of the above first formula, and the second graph area is determined as identical to the first graph area, processing of Step S112 may be directly performed, i.e. the second graph label 32b may be directly created and displayed by using the coordinates of the plot points of the above first formula, without performing communication processing with the server 20 (S109, S110, S111) (in FIG. 3A, an arrow proceeding from Step S108 to Step S112 is illustrated as well).

Processing integrating the two graph labels 32a, 32b into a single graph label is described hereinafter.

FIG. 3B is a diagram illustrating an example of a process in which after the process as illustrated in FIG. 3A, the graph area of the first graph label 32a is changed from the first graph area to a third graph area, and the graph is redrawn.

Figure 10:
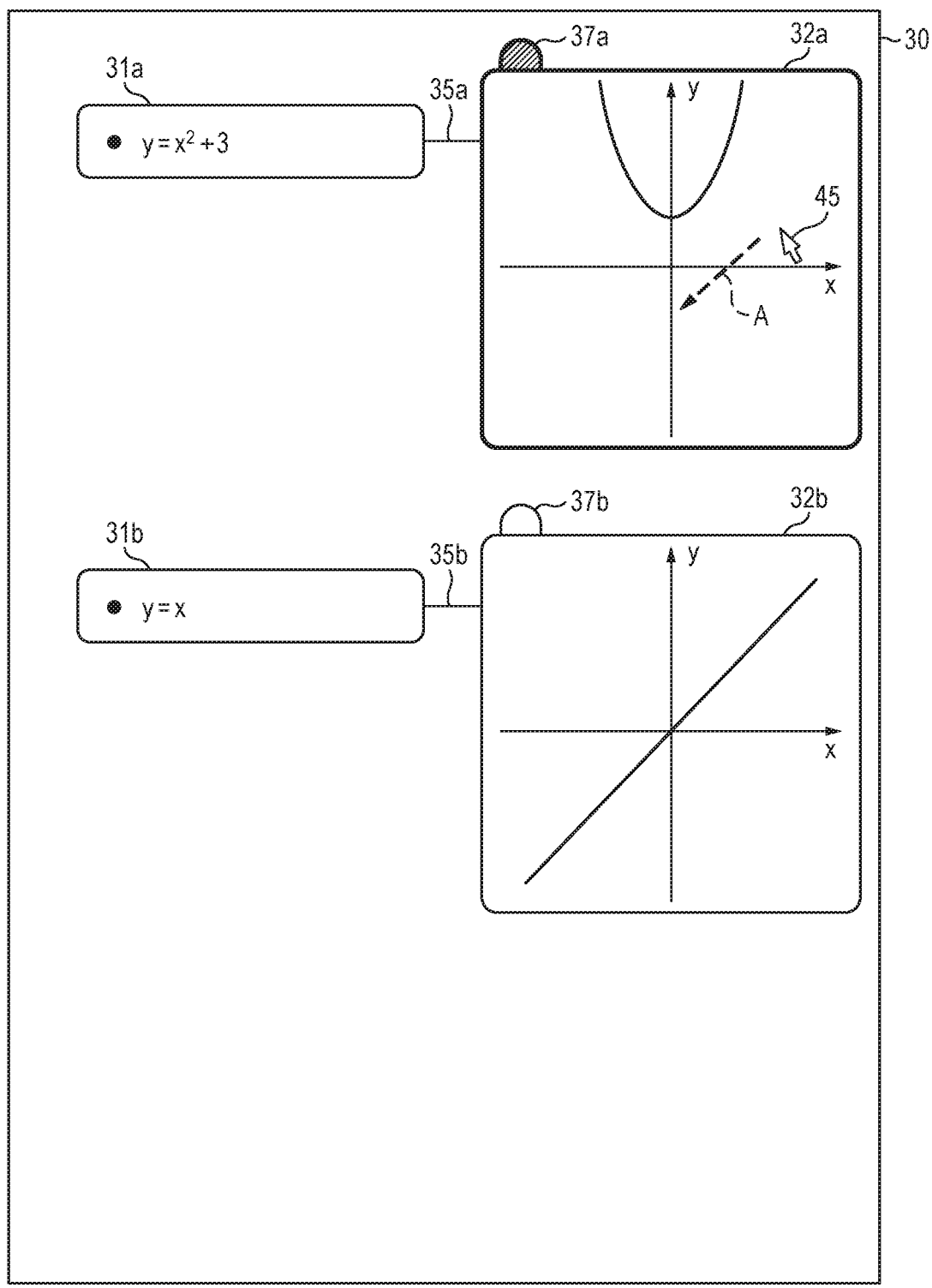
FIG. 10 is a diagram illustrating an example of the display screen of the communication device.

The user, for example, moves the cursor 45 onto the first graph area of the first graph label 32a on the display screen 30 and, in a state with the first graph area being selected, moves (drags) the cursor in the direction of the inclined downward arrow A drawn with broken line as illustrated in FIG. 10. The communication device 10 accepts selection of the first graph label and display region movement indication of the first graph label (Step S113). Thereby, the first graph area is changed from $-5 \le x \le 5$, $-5 \le y \le 5$ to, for example, $-1 \le x \le 9$, $-1 \le y \le 9$. The new graph area after movement is referred to as the third graph area (a coordinate range for integration).

Further, upon accepting display region movement indication of the first graph label, the communication device 10 accepts a request of graph drawing and sends the data of the first formula and the data of the third graph area of the first graph label 32a to the server 20 together with the request of graph drawing (Step S114).

The server 20, in response to the request of graph drawing, calculates new coordinates of plot points based on the input data received from the communication device 10, i.e. the data of the first formula and the data of the third graph area of the first graph label 32a (Step S115).

The server 20 sends, to the communication device 10, data of the coordinates of the new plot points after movement calculated in Step S115 (Step S116).

Figure 11:
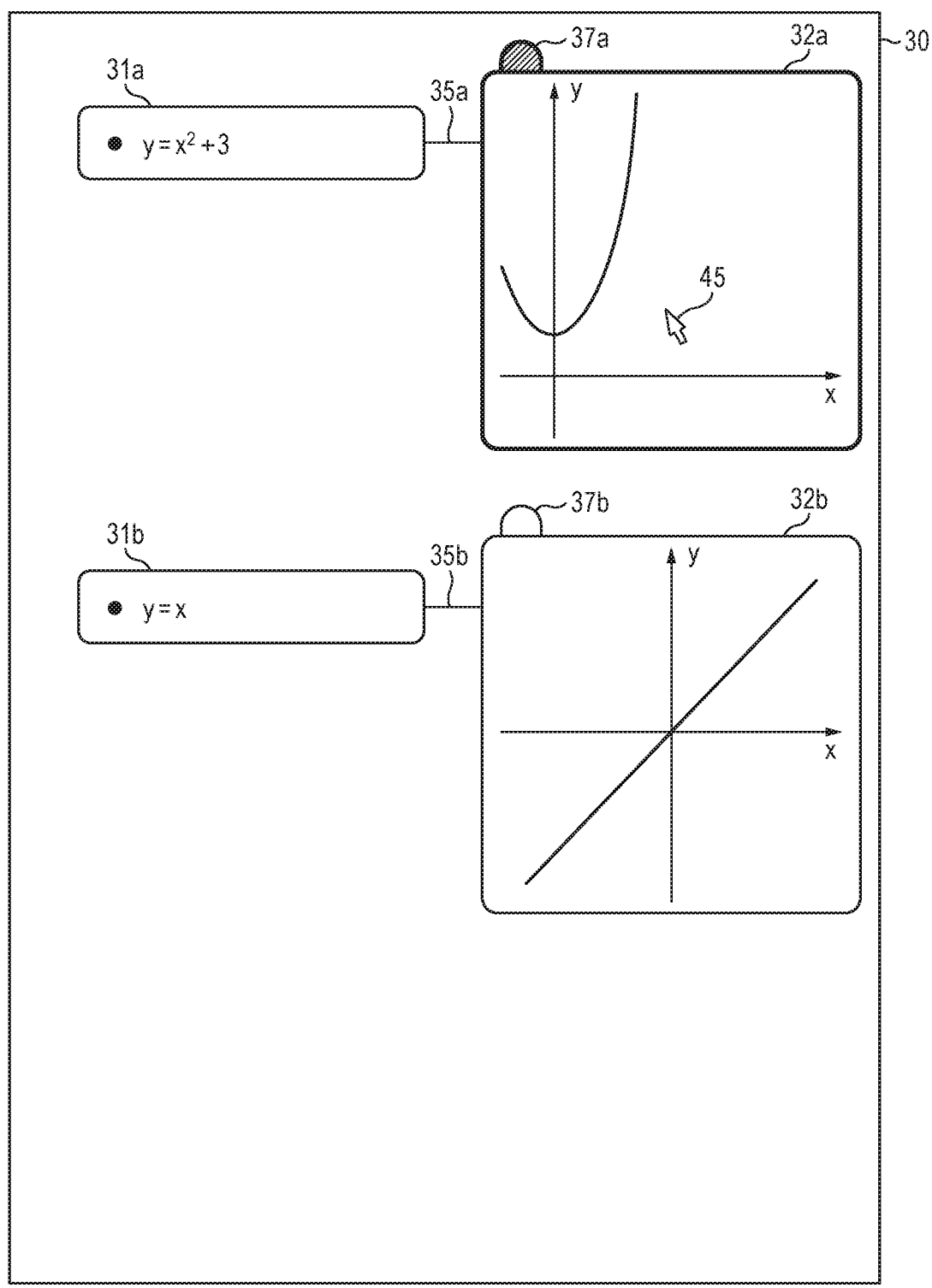
FIG. 11 is a diagram illustrating an example of the display screen of the communication device.

The communication device 10, as illustrated in FIG. 11, draws and displays a graph of the first formula on the third graph area of the first graph label 32a by using the coordinates of the new plot points after movement that are calculated on the server 20 (Step S117).

In FIGS. 10 and 11, the tab 37a of the first graph label 32a selected by the cursor 45 is illustrated with shade lines. The tab 37a may be actually displayed by color as well. Further, borders of the selected first graph label 32a may be displayed thicker than before selection.

In Step S117, simultaneously with graph drawing, the data of the coordinates of the new plot points after movement received from the server 20 is stored in the storage 13. The communication device 10 relates the coordinate data of the plot points of the first formula in the third graph area of the first graph label 32a with the first formula and the third graph area and stores the same in the storage 13.

FIG. 3C illustrates an example of a process integrating the two graph labels 32a, 32b after the process as illustrated in FIGS. 3A and 3B, i.e. a graph area integration process of the two graph labels 32a, 32b having different graph areas.

Figure 12:
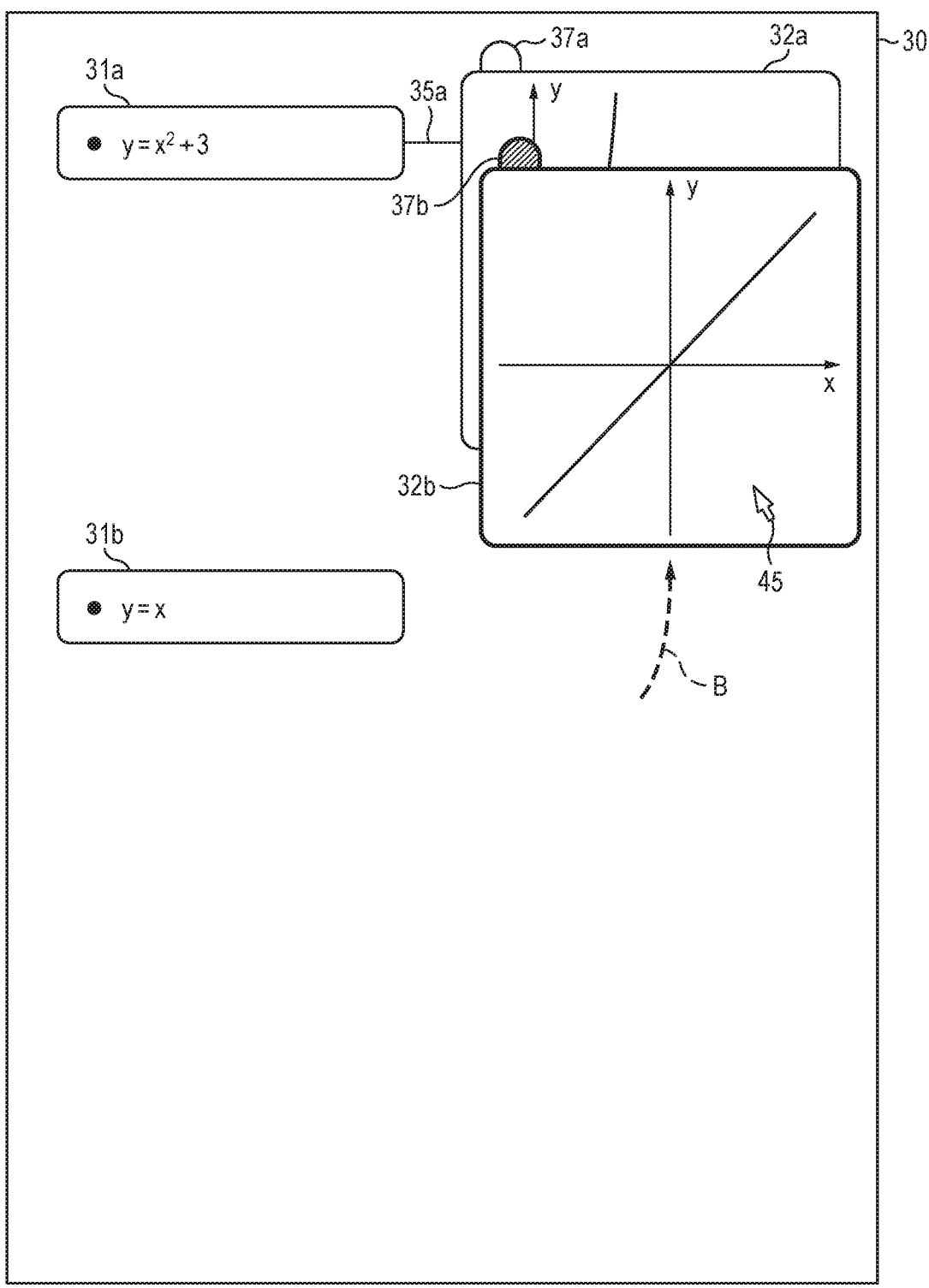
FIG. 12 is a diagram illustrating an example of the display screen of the communication device.

The user, for example, moves the cursor 45 onto the second graph area of the second graph label 32b on the display screen 30 and, in a state with the second graph area being selected, moves the cursor in the direction of the upward arc-like arrow B drawn with broken line as illustrated in FIG. 12, so as to overlap (drag-and-drop) above the first graph label 32a. The communication device 10 accepts selection of the second graph label and drag-and-drop indication of the second graph label 32b onto the first graph label 32a (Step S118).

After Step S118, the communication device 10 determines whether recalculation of the coordinate data of the plot points by the server 20 is necessary, and thereby, recalculation is determined as necessary (Step S119). Details of the determination will be described below. Here, since recalculation is necessary, the communication device 10 accepts the request of graph drawing.

The communication device 10 sends the data of the second formula and the third graph area of the first graph label 32a to the server 20 together with the request of graph drawing (Step S120).

The server 20, in response to the graph drawing request, calculates coordinates of plot points (third plot points) to be plotted on the first graph label 32a as a graph of the second formula based on the input data received from the communication device 10 (Step S121).

The server 20 sends, to the communication device 10, data of the coordinates of the plot points calculated in Step S121 (Step S122).

After Step S122, the communication device 10 draws a graph of the second formula in a manner that the graph of the second formula overlaps on the third graph area of the first graph label 32a on which the graph of the first formula has been drawn, by using the coordinates of the plot points received from the server 20 (Step S123). In Step S123, simultaneously with graph drawing, the data of the coordinates of the new plot points received from the server 20 is stored in the storage 13. The communication device 10 relates the coordinate data of the plot points of the second formula in the third graph area of the first graph label 32a with the second formula and the third graph area, and stores the same in the storage 13. Further, in Step S123, the communication device 10 executes processing so as to integrate the two formula labels 31a, 31b.

Figure 13:
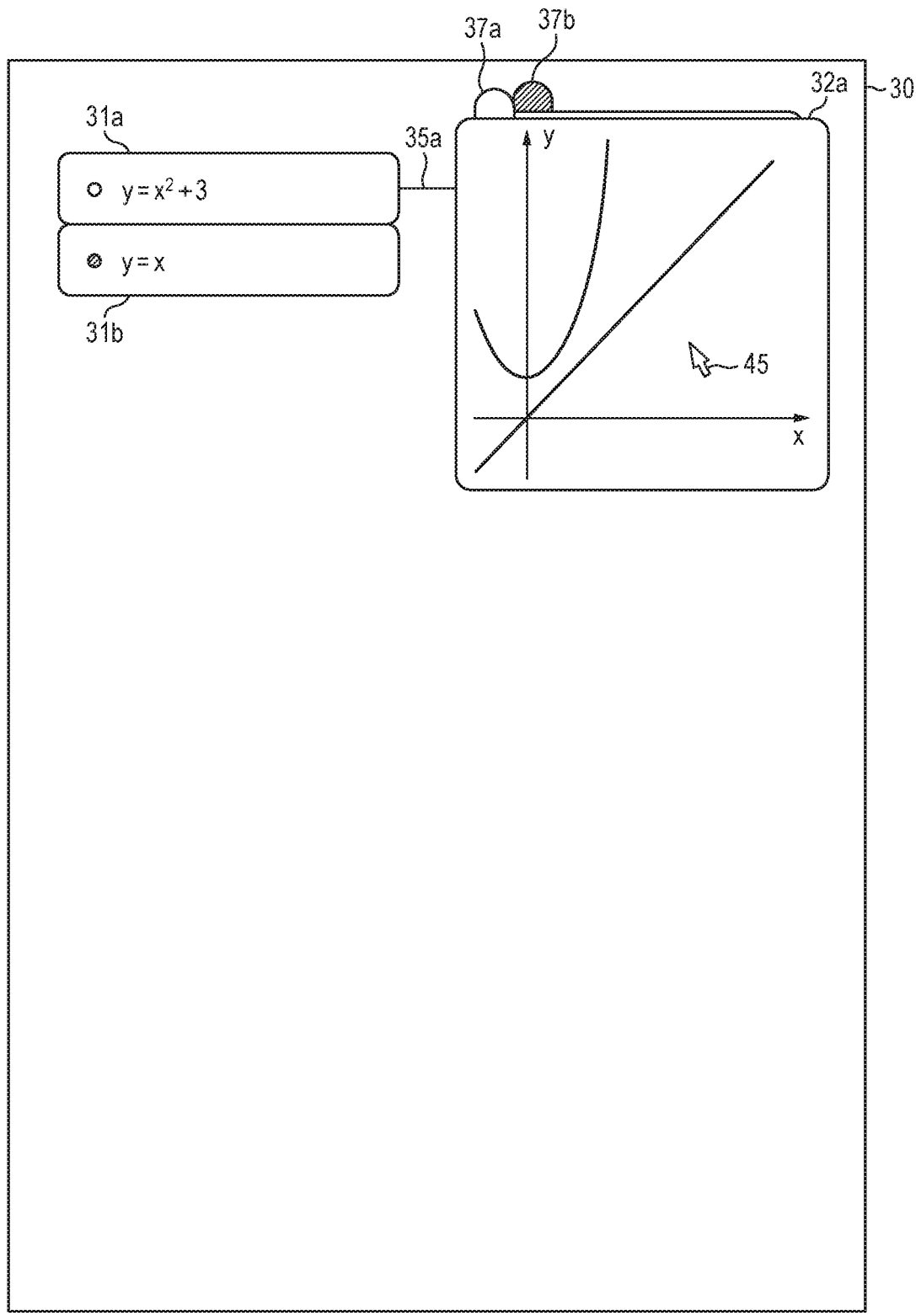
FIG. 13 is a diagram illustrating an example of the display screen of the communication device.

FIG. 13 is a diagram illustrating an example of the display screen 30 when the two graph labels 32a, 32b are integrated. Here, the second graph label 32b is integrated with the first graph label 32a, and the graph of the first formula $y=x^2+3$ and the graph of the second formula $y=x$ are drawn on the third graph area of the first graph label 32a. The first formula label 31a and the second formula label 31b are integrated, and thus are displayed in a manner that the first formula label 31a and the second formula label 31b are stuck to each other. The integrated formula labels 31a, 31b become a single floating object, and can be moved integrally.

The communication device 10 stores the data of the first formula, the data of the second formula, and the third graph area so as to be relate to the integrated graph labels.

In FIGS. 12 and 13, the tab 37b of the second graph label 32b drag-and-dropped in Step S118 is illustrated with shade lines. The tab 37b may be actually displayed by color as well.

The integration processing may be performed by drawing the two graphs on a new graph label other than the first graph label 32a and the second graph label 32b. For example, the graph area of the new graph label may be the graph area of the first graph label 32a, where the graph of the first formula and the graph of the second formula may be drawn.

After the integration processing, the tab 37a as illustrated in FIG. 13 is displayed by the same mark, design or color as the mark, design or color in front of (in FIG. 13, on the left side of) the formula in the first formula label 31a, and similarly, the tab 37b is displayed by the same mark, design or color as the mark, design or color in front of (in FIG. 13, on the left side of) the formula in the second formula label 31b. The line color of the graph is the same as well.

In the above example, in the first and the second graph areas of the two graph labels 32a, 32b, the size of the x range and the size of the y range are respectively the same, but may be different as well. Namely, expansion operation or reduction operation may be performed.

Although the above has described specific operation with the processes as illustrated in FIGS. 3A, 3B, and 3C performed in this order, the process as illustrated in FIG. 3C may naturally be performed after the process as illustrated in FIG. 3A (FIG. 3C also illustrates an arrow proceeding from Step S119 to Step S123). If recalculation is unnecessary, integration processing may be executed directly without inquiring the server 20. Hereinafter, the integration process of the two labels in the present embodiment is described with a generalized flow chart with respect to the integration process of the two graph labels 32a, 32b as illustrated in FIG. 3C.

Figure 14:
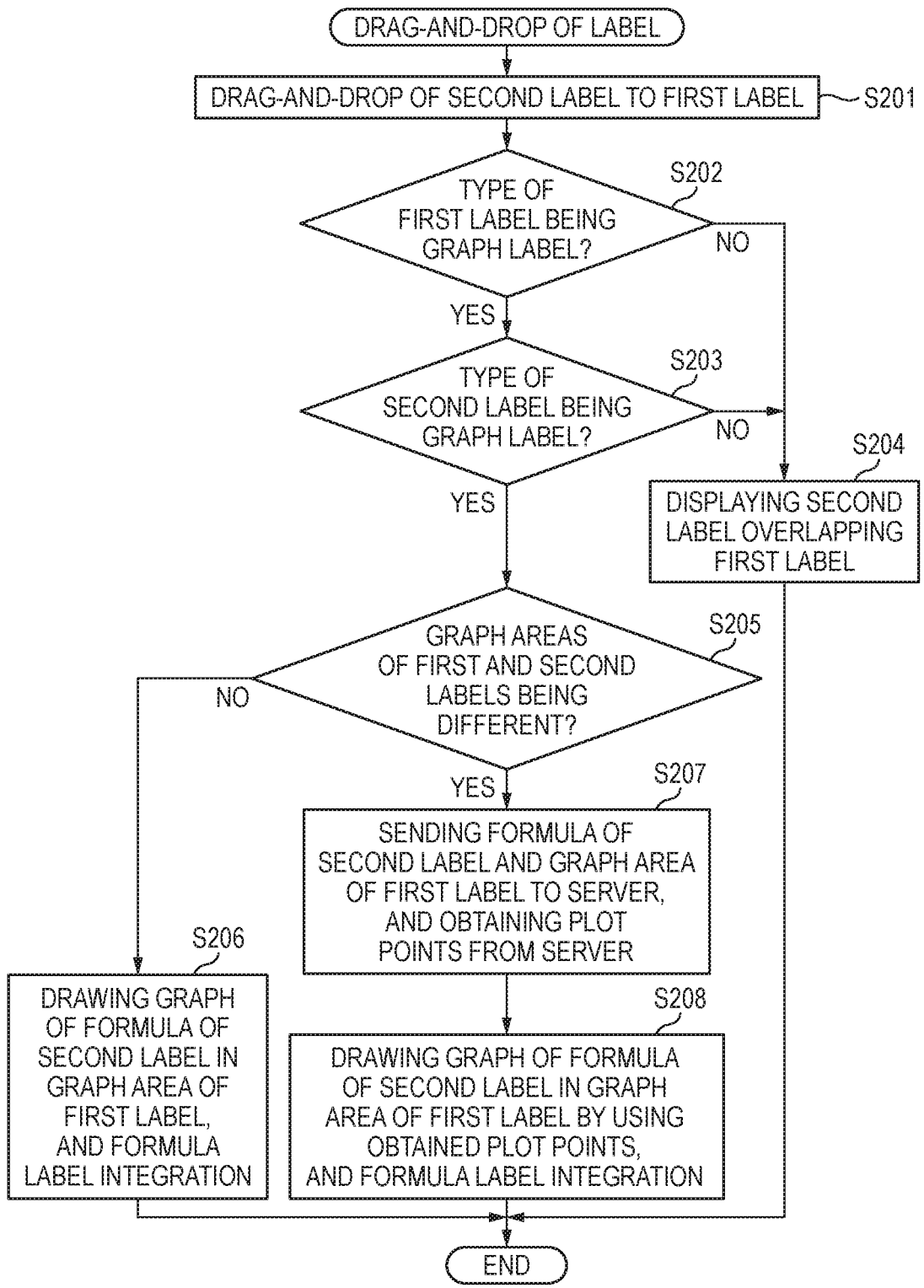
FIG. 14 is a diagram illustrating an example of a flow chart of an operation integrating the two labels.

FIG. 14 is a diagram illustrating an example of a flow chart in an integration operation of the two labels. This corresponds to Steps S118 to S123 in FIG. 3C. In particular, the recalculation determination in Step S119 corresponds to Steps S202, S203, and S205.

The communication device 10 accepts drag-and-drop processing of the second label to the first label (Step S201).

The communication device 10 determines whether the type of the first label is graph label (Step S202). If the type of the first label is not determined as graph label (Step S202—No), the processing proceeds to Step S204. If the type of the first label is determined as graph label (Step S202—Yes), the processing proceeds to Step S203.

In Step S203, the communication device 10 determines whether the type of the second label is graph label. If the type of the second label is not determined as graph label (Step S203—No), the processing proceeds to Step S204. If the type of the second label is determined as graph label (Step S203—Yes), the processing proceeds to Step S205.

Therefore, if the type of the first label is not determined as graph label (Step S202—No), or if the type of the first label is determined as graph label but the type of the second label is not determined as graph label (Step S202—Yes and Step S203—No), the processing proceeds to Step S204. In Step S204, the communication device 10 executes processing so as to display the second label overlapping the first label. After Step S204, the processing is ended.

If both the first label and the second label are determined as graph labels (Step S203—Yes), the processing proceeds to Step S205. In Step S205, the communication device 10 determines whether the graph area of the first label and the graph area of the second label are different.

If the graph areas of the two labels are determined as not different, i.e. the same (Step S205—No), the processing proceeds to Step S206. In Step S206, the communication device 10 draws a graph of the formula linked up with second label in the graph area (integrated coordinate system) of the first label. Further, the two formula labels are integrated. After Step S206, the processing is ended.

If the graph areas of the two labels are determined as different (Step S205—Yes), the processing proceeds to Step S207. In Step S207, the communication device 10 sends, to the server 20, the data of the second formula linked up with the second label and the data of the graph area of the first label, and obtains data of coordinates of plot points calculated on the server 20 based thereon. Even if the graph areas are different, there are cases where recalculation is unnecessary if the graph areas are included in the original graph area.

The communication device 10, in Step S208, draws a graph of the second formula linked up with the second label in the graph area (integrated coordinate system) of the first label by using the obtained coordinate data of the plot points. Further, the two formula labels are integrated. After Step S208, the processing is ended.

In this way, in the present embodiment, when performing drag-and-drop operation overlapping one label onto another label, if not both of the labels are graph labels, the one label merely overlaps the other label without performing the integration processing. If both of the labels are graph labels, the integration processing is executed. At this time, if the graph areas of the one graph label (subject label to be integrated) and the other graph label (subject label to integrate) are in accordance with each other, calculated coordinate data of the plot points of the subject label to be integrated is read and drawn in a manner overlapping the graph area of the subject label to integrate. On the other hand, if the graph areas of the subject label to be integrated and the subject label to integrate are different, the formula data of the formula label linked up with the subject label to be integrated and the data of the graph area of the subject label to integrate is sent to the server 20, and the coordinates of the plot points is recalculated on the server 20 based thereon. By using the recalculated coordinates of the plot points, a graph is drawn based on the formula data of the formula label linked up with the subject label to be integrated, in an overlapping manner, for example, on the graph area of the subject label to integrate.

Namely, if the graph areas of the two graph labels 32a, 32b to overlap in the drag-and-drop processing are in accordance with each other, since the coordinate data of the plot points stored in the storage 13 can be used in drawing, the two graph labels 32a, 32b are integrated without recalculation by the server 20. Further, if the graph areas of the two graph labels 32a, 32b are different, among the coordinate data of the plot points of the two graph labels 32a, 32b stored in the storage 13, since only one can be directly used while the other cannot be used or the data is insufficient, recalculation is performed by the server 20.

The integration processing has been described with the graph of the formula linked up with the graph label to overlap in drag-and-drop (the forward graph label) drawn in the graph area (integrated coordinate system) of the graph label to be overlapped (the back graph label), and the same goes vice versa. Namely, the communication device 10 may be set such that the graph of the formula linked up with the graph label to be overlapped in drag-and-drop (the back graph label) is drawn in the graph area (integrated coordinate system) of the graph label to overlap (the forward graph label).

Namely, according to the present embodiment, when either one among the first formula input on the first formula label and the second formula input on the second label is used as a subject formula to integrate and the other is used as a subject formula to be integrated, the CPU 11 has a function as a graph integration unit that draws the graph representing the subject formula to be integrated together with the subject formula to integrate among the first graph drawn on the first graph label 32a and the second graph drawn on the second graph label 32b in the coordinate range for integration among the first coordinate range set in the first graph label 32a and the second coordinate range set in the second graph label 32b, i.e. the coordinate range related to the subject formula to integrate, in one graph specifying unit displayed on the display.

The integration processing is not limited to the exemplified one, and may be set, for example, to draw the graph of the formula linked up with the overlapped graph label and the graph of the formula linked up with the overlapping graph label in another graph area (one coordinate range among the first coordinate range and the second coordinate range; the coordinate range for integration) determined based on the graph area (the one coordinate range) of the overlapped graph label (one area among the first area and the second area) in drag-and-drop and the graph area (the other coordinate range among the first coordinate range and the second coordinate range) of the overlapping graph label (the other area among the first area and the second area).

Namely, when either one of the graph area of the overlapped graph label and the graph area of the overlapping graph label is used as the coordinate range for integration, either one of the entire graph of the formula linked up with the overlapped graph label and the entire graph of the formula linked up with the overlapping graph label may satisfy conditions for existing outside the coordinate range for integration. Therefore, when such conditions are satisfied, by setting the above other graph area, the graph representing the formula linked up with the overlapped graph label and the graph representing the formula linked up with the overlapping graph label can be simultaneously displayed visibly in the display screen of the display. Thereby, the user can easily grasp the relative positional relationship of the two graphs after integration, which is considered as contributing to the learning effect.

Other than the integration processing via drag-and-drop operation, the integration processing may be also performed by displaying and selecting an integrate button as a special icon indicating synthesis of the two graph labels on the display screen 30. The integrate button is displayed, for example, by selecting "show/hide the integrate button" from a menu displayed when any position on the screen is selected by the user. In this case, for example, by selecting the integrate button after selecting the two graph labels, the two graph labels are synthesized into a single graph label. The user may appropriately set which one of the graph areas of the graph labels on the synthesized graph label is used. For example, the communication device 10 may change the graph area of the first graph label 32a to the graph area of the second graph label 32b upon synthesis indication by the integrate button.

As described above, in the present embodiment, when one graph label is drag-and-dropped onto the other graph label, by drawing the graph of the one formula label in accordance with the graph area of the other graph label, the two formula labels are integrated. Therefore, in the present embodiment, it is possible to easily execute integration of two graphs via simple operation, which improves operability relating to graph drawing.

When integrating two formula labels, since at least one coordinate data is reused among two coordinate data of plot points stored in the communication device 10, computational complexity on the server 20 is lowered, which improves the operation speed. Namely, useless calculation can be excluded. Further, it is possible to prevent client terminal & server communication due to calculation as much as possible.

In the case of drag-and-dropping a label other than graph label, the labels can be overlapped via ordinary overlapping operation. Synthesis of graphs can be executed via simple operation while ordinary overlapping is enabled as well.

Although the above description is made with respect to integration of two labels, the number of labels is not limited thereto. Three or more labels can be integrated similarly.

Since the coordinates of the plot points related to the formulae and the graph areas are stored in the storage 13 of the communication device 10, an operation separating each graph label 32a, 32b can be performed after integration as well. The separating operation is accepted and executed by the communication device 10 by, for example, the user selecting and dragging the tab 37a accompanying the first graph label 32a or the tab 37b accompanying the second graph label 32b. After separation, as illustrated in FIG. 9, the first formula label 31a, the first graph label 32a, the line 35a, and the tab 37a; and the second formula label 31b, the second graph label 32b, the line 35b, and the tab 37b, are displayed. After separation, they may be displayed at positions corresponding to the position at which the drag-and-dropped graph label is dropped or displayed with the first graph label 32a and the first graph label 32a aligned with each other. Upon separation, since the communication device 10 can reuse the coordinate data of the plot points of the first formula in the first graph area of the first graph label 32a and the coordinate data of the plot points of the second formula in the second graph area of the second graph label 32b stored in the storage 13 in each above step S106, S112, S117, and S123, communication processing by the server 20 is unnecessary.

The processing performed by the communication device may be performed by the server 20 as well. In particular, heavy processing is worth performing on the server 20. For example, Step S119 of the process as illustrated in FIG. 3C may be executed by the server 20; the data of the coordinates of the plot points calculated in Steps S104, S110, S115, and S121 as illustrated in FIGS. 3A to 3C may be stored in the mass storage 23 of the server 20 together with the formula data and/or the graph area data, and such data can be read from the mass storage 23 and used in the recalculation determination in Step S119.

Here, deformation is not limited to the above-described embodiment, and various modifications can be made within the scope without departing from the scope of the present invention during execution phase. Further, the structures of the embodiments may be combined as appropriate, in which case combined effects can be obtained. Moreover, various inventions are included in the above embodiment, and various inventions can be extracted by selecting and combining the disclosed plurality of constituent features. For example, when the problem is solved and the effects are obtained even if some constituent features are removed from all constituent features as described in the embodiments, the configuration with these constituent features remove can be extracted as an invention.

The invention claimed is:

1. A display control method executed by a client terminal, the display control method comprising:
  accepting input of a first formula and a second formula;
  controlling a display to display on a display screen:
    a first graph area showing a first coordinate system having a first coordinate range and a first graph corresponding to the first formula inputted; and
    a second graph area showing a second coordinate system having a second coordinate range and a second graph corresponding to the second formula inputted;
  accepting a user operation of moving one of the first graph area and the second graph area displayed on the display screen so as to overlap at least a part of the one of the first graph area and the second graph area onto the other of the first graph area and the second graph area; and
  in response to acceptance of the user operation,
    determining whether the first coordinate range and the second coordinate range are different; and
    in response to determining that the first coordinate range and the second coordinate range are different:
      setting a coordinate range which is the same as the first coordinate range, as a coordinate range for integration; and
      controlling the display to display on the display screen:
        an integrated coordinate system having the coordinate range for integration;
        the first graph based on first plot points calculated by using the first coordinate range and the first formula in the integrated coordinate system; and
        the second graph based on second plot points calculated by using the coordinate range for integration and the second formula in the integrated coordinate system.

2. A display control method executed by a client terminal, the display control method comprising:
  accepting input of a first formula and a second formula;
  controlling a display to display on a display screen:
    a first graph area showing a first coordinate system having a first coordinate range and a first graph corresponding to the first formula inputted; and
    a second graph area showing a second coordinate system having a second coordinate range and a second graph corresponding to the second formula inputted;
  before acceptance of a user operation of moving one of the first graph area and the second graph area displayed on the display screen so as to overlap at least a part of the one of the first graph area and the second graph area onto the other of the first graph area and the second graph area:
    storing the first formula, the first coordinate range and first plot points in a storage while associating the first formula, the first coordinate range and the first plot points with each other, wherein the first plot points are plot points calculated by using the first coordinate range and the first formula; and
    storing the second formula, the second coordinate range and second plot points in the storage while associating the second formula, the second coordinate range and the second plot points with each other, wherein the second plot points are plot points calculated by using the second coordinate range and the second formula;

accepting the user operation; and in response to acceptance of the user operation:

determining whether recalculation of the first plot points, the second plot points or the first plot points and the second plot points is necessary;

in response to determining that recalculation is necessary:

setting a coordinate range which is the same as the first coordinate range, as a coordinate range for integration, and sending the second formula and the coordinate range for integration to a server; and receiving third plot points from the server, wherein the third plot points are plot points calculated by the server based on the second formula and the coordinate range for integration; and controlling the display to display on the display screen:

an integrated coordinate system having the coordinate range for integration;

the first graph based on the first plot points read from the storage in the integrated coordinate system; and the second graph based on the third plot points received from the server in the integrated coordinate system.

3. A display control method executed by a client terminal, the display control method comprising:

accepting input of a first formula and a second formula;

controlling a display to display on a display screen:

a first graph area showing a first coordinate system having a first coordinate range and a first graph corresponding to the first formula inputted; and a second graph area showing a second coordinate system having a second coordinate range and a second graph corresponding to the second formula inputted;

accepting a user operation of moving one of the first graph area and the second graph area displayed on the display screen so as to overlap at least a part of the one of the first graph area and the second graph area onto the other of the first graph area and the second graph area; and in response to acceptance of the user operation, determining whether the first coordinate range and the second coordinate range are the same; and in response to determining that the first coordinate range and the second coordinate range are the same:

setting a coordinate range which is the same as the first coordinate range and the second coordinate range, as a coordinate range for integration;

reading, from a storage, first plot points calculated by using the first coordinate range and the first formula and second plot points calculated by using the second coordinate range and the second formula; and controlling the display to display on the display screen:

an integrated coordinate system having the coordinate range for integration;

the first graph based on the first plot points read from the storage in the integrated coordinate system; and the second graph based on the second plot points read from the storage in the integrated coordinate system.

4. The display control method according to claim 3 the display control method comprising:

before acceptance of the user operation:

storing the first formula, the first coordinate range and the first plot points in the storage while associating the first formula, the first coordinate range and the first plot points with each other; and storing the second formula, the second coordinate range and the second plot points in the storage while associating the second formula, the second coordinate range and the second plot points with each other.

5. A display control method executed by a client terminal, the display control method comprising:

accepting input of a first formula and a second formula;

controlling a display to display on a display screen:

a first graph area showing a first coordinate system having a first coordinate range and a first graph corresponding to the first formula inputted; and a second graph area showing a second coordinate system having a second coordinate range and a second graph corresponding to the second formula inputted;

accepting a user operation of moving one of the first graph area and the second graph area displayed on the display screen so as to overlap at least a part of the one of the first graph area and the second graph area onto the other of the first graph area and the second graph area; and in response to acceptance of the user operation, determining whether the first coordinate range and the second coordinate range are different; and in response to determining that the first coordinate range and the second coordinate range are different:

setting a coordinate range other than the first coordinate range and the second coordinate range, as a coordinate range for integration; and controlling the display to display on the display screen:

an integrated coordinate system having the coordinate range for integration;

the first graph based on plot points calculated by using the coordinate range for integration and the first formula in the integrated coordinate system; and the second graph based on plot points calculated by using the coordinate range for integration and the first formula in the integrated coordinate system.

6. A control method executed by a server, the control method comprising:

receiving, from a client terminal, a first formula, a first coordinate range corresponding to the first formula, a second formula, and a second coordinate range corresponding to the second formula;

calculating first plot points based on the first formula and the first coordinate range;

storing the first formula, the first coordinate range and the first plot points in a storage while associating the first formula, the first coordinate range and the first plot points with each other;

calculating second plot points based on the second formula and the second coordinate range;

storing the second formula, the second coordinate range and the second plot points in the storage while associating the second formula, the second coordinate range and the second plot points with each other;
sending the first plot points and the second plot points to the client terminal;
receiving information indicating that the client terminal accepted a user operation of moving one of a first graph area and a second graph area displayed on a display screen of a display so as to overlap at least a part of the one of the first graph area and the second graph area onto the other of the first graph area and the second graph area,
 wherein the first graph area shows a first coordinate system having the first coordinate range and a first graph corresponding to the first formula and the second graph area shows a second coordinate system having the second coordinate range and a second graph corresponding to the second formula;
determining whether the first coordinate range and the second coordinate range are different;
in response to determining that the first coordinate range and the second coordinate range are different, calculating third plot points by using the second formula and a coordinate range for integration determined based on the first coordinate range and the second coordinate range; and
sending the third plot points to the client terminal, for the client terminal to control the display to display on the display screen:
 an integrated coordinate system having the coordinate range for integration;
 the first graph based on the first plot points in the integrated coordinate system; and
 the second graph based on the third plot points in the integrated coordinate system.

7. A client terminal comprising:
a processor configured to:
 accept input of a first formula and a second formula;
 control a display to display on a display screen:
  a first graph area showing a first coordinate system having a first coordinate range and a first graph corresponding to the first formula inputted; and
  a second graph area showing a second coordinate system having a second coordinate range and a second graph corresponding to the second formula inputted;
 accept a user operation of moving one of the first graph area and the second graph area displayed on the display screen so as to overlap at least a part of the one of the first graph area and the second graph area onto the other of the first graph area and the second graph area; and
 in response to acceptance of the user operation,
  determine whether the first coordinate range and the second coordinate range are different; and
  in response to determining that the first coordinate range and the second coordinate range are different:
   set a coordinate range which is the same as the first coordinate range, as a coordinate range for integration; and
   control the display to display on the display screen:
    an integrated coordinate system having the coordinate range for integration;
    the first graph based on first plot points calculated by using the first coordinate range and the first formula in the integrated coordinate system; and
    the second graph based on second plot points calculated by using the coordinate range for integration and the second formula in the integrated coordinate system.

* * * * *